United States Patent
Lemoine et al.

(10) Patent No.: US 10,254,394 B2
(45) Date of Patent: Apr. 9, 2019

(54) METHOD FOR MANAGING CROSSOVERS IN THE TRACKING OF MOBILE OBJECTS, AND ASSOCIATED DEVICE

(71) Applicant: THALES, Courbevoie (FR)

(72) Inventors: Jean-Marie Lemoine, Elancourt (FR); Jean-Yves Delabbaye, Elancourt (FR); Claude Jousselin, Elancourt (FR)

(73) Assignee: THALES, Courbevoie (FR)

( * ) Notice: Subject to any disclaimer, the term of this patent is extended or adjusted under 35 U.S.C. 154(b) by 39 days.

(21) Appl. No.: 15/506,655

(22) PCT Filed: Sep. 4, 2015

(86) PCT No.: PCT/EP2015/070210
§ 371 (c)(1),
(2) Date: Feb. 24, 2017

(87) PCT Pub. No.: WO2016/034695
PCT Pub. Date: Mar. 10, 2016

(65) Prior Publication Data
US 2017/0254894 A1 Sep. 7, 2017

(30) Foreign Application Priority Data
Sep. 5, 2014 (FR) ...................................... 14 01991

(51) Int. Cl.
*G01S 13/72* (2006.01)
*G01S 15/66* (2006.01)
*G01S 17/66* (2006.01)

(52) U.S. Cl.
CPC ............ *G01S 13/726* (2013.01); *G01S 15/66* (2013.01); *G01S 17/66* (2013.01)

(58) Field of Classification Search
CPC ........ G01S 15/66; G01S 13/726; G01S 17/66; G01S 3/7864
See application file for complete search history.

(56) References Cited

U.S. PATENT DOCUMENTS

| 6,081,764 A | 6/2000 | Varon |
| 6,278,401 B1 * | 8/2001 | Wigren .................. G01S 3/325 |
| | | 342/108 |
| 2005/0131646 A1 * | 6/2005 | Camus .................. B60R 21/013 |
| | | 701/301 |

FOREIGN PATENT DOCUMENTS

EP          1 533 628 A1       5/2005

OTHER PUBLICATIONS

Yaakov Bar-Shalom et al., "Estimation and Tracking: Principles, Techniques, and Software," Chapter 5, pp. 207-257, Artech House 1993.

Samuel Blackman et al., "Design and Analysis of Modern Tracking Systems," Chapter 4, pp. 198-257, Artech House 1999.

(Continued)

*Primary Examiner* — Bryan Bui
(74) *Attorney, Agent, or Firm* — Baker & Hostetler LLP

(57) ABSTRACT

A method for managing track crossovers and a device for tracking mobile objects that is suitable for implementing the method are provided. The method for managing track crossovers comprises, for each track at a given time, a step Stp1 of testing in order to determine whether the track in question is ambiguous or not at the given time and, if the track is ambiguous, a step Stp2 of specific processing of the estimate of the track.

18 Claims, 2 Drawing Sheets

(56) References Cited

OTHER PUBLICATIONS

Aoki et al., "The Rao-Blackwellized marginal M-SMC filter for Bayesian multi-target tracking and labelling," 2012 15th IEEE International Conference on Information Fusion, Jul. 9, 2012, pp. 90-97, XP032228407.
Blom et al., "Tracking closely spaced targets: Bayes outperformed by an approximation," 2008 11th IEEE International Conference on Information Fusion, Jun. 30, 2008, pp. 1-8, XP031931852.
Gavriloaia et al., "An Ad-Hoc Method for Avoiding Tracks Coalescence in Pdaf for Tracks Fusion," 7th International Conference on NIS, Telecommunications in Modern Satellite, Cable and Broadcasting Service S, Sep. 2005, vol. 2, pp. 579-582, XP010874693.
Kennedy, Controlling track coalescence with scaled Joint Probabilistic Data Association, 2008 International Conference on Radar, Sep. 2, 2008, pp. 440-445, XP031350497.
Ekman et al., "Particle filters for tracking closely spaced targets," IEEE 2007 10th International Conference on Information Fusion, Jul. 1, 2007, pp. 1-8, XP031193877.
Bar-Shalom et al., "Multitarget-Multisensor Tracking: Principles and Techniques," IEEE Aerospace and Electronic Systems Magazine, vol. 11, No. 2, Feb. 1, 1996, pp. 41, XP011393877.
Blackman, "Multiple hypothesis tracking for multiple target tracking," IEEE Aerospace and Electronic Systems Magazine, vol. 19, No. 1, Jan. 1, 2004, pp. 5-18, XP011244428.

\* cited by examiner

METHOD FOR MANAGING CROSSOVERS IN THE TRACKING OF MOBILE OBJECTS, AND ASSOCIATED DEVICE

CROSS-REFERENCE TO RELATED APPLICATIONS

This application is a National Stage of International patent application PCT/EP2015/070210, filed on Sep. 4, 2015, which claims priority to foreign French patent application No. FR 1401991, filed on Sep. 5, 2014, the disclosures of which are incorporated by reference in their entirety.

FIELD OF THE INVENTION

The present invention relates to the field of the tracking of mobile objects. The present invention more particularly relates to a method for managing crossovers in the tracking of mobile objects and to a device suitable for implementing such a method. The method and the device may in particular be applied to track ships and aircraft.

BACKGROUND

Tracking a set of mobile objects with one or more sensors consists in exploiting over time the data output by the group of at least one sensor to construct and update a set of tracks corresponding to the various objects perceived by the one or more sensors. It is a question of grouping as time passes the measurements made for the various tracked objects so as to obtain homogeneous groupings, each grouping having to correspond to a different object, and each grouping constituting a track following the same object as time passes. The objects to be tracked and the one or more sensors may be moving.

The data corresponding to the various mobile objects present in the environment monitored by the one or more sensors may for example include information on the position of said objects. Depending on the sensor, the data may be measured values, such as for example an azimuth in the case of an ESM (electronic support measure) sensor, or measurement vectors such as for example vectors consisting of an azimuth and a distance in the case of a radar sensor, or vectors consisting of an azimuth and an elevation in the case of an optronic sensor. The data vectors may also contain characteristic measurements describing the objects. In certain cases, the position information may consist of a dated position of the sensor and one or more parameters relating to the location of the object in space relative to the sensor.

One problem, in the field of the tracking of mobile objects, is that of correctly tracking the progress of the various objects over time. When similar objects, i.e. objects that are indiscriminable by the characteristic measurements taken by one or more sensors, move through space it is possible that they cross over in terms of their perception from the carrier of the one or more sensors, i.e. that the measurements of the relative position of the objects with respect to said carrier momentarily coincide. Ambiguities are then spoken of. In this case, it becomes difficult, over a more or less long duration, to know whether the information produced by the one or more sensors corresponds to one object or to another. One problem that arises is that of knowing how to group and track the measurements when some of them become momentarily ambiguous. Under these conditions, during the processing of the data, mixups may occur and one or more measurements may be attributed to incorrect tracks. This may degrade the quality of the tracking of the objects and may lead to incorrect characterizations, discontinuities or track splitting at the moment of the crossover. In this context, it is advantageous to have a solution allowing the processing of the tracking to be improved during these crossover situations.

The tracking of objects or of targets is widely treated in the literature (see for example Yaakov Bar-Shalom, Xiao-Rong Li—"Estimation and Tracking"—Artech House 1993 or Samuel Blackman, Robert Popoli—"Design and Analysis of Modern Tracking Systems"—Artech House 1999). This tracking consists in associating newly produced information with tracks already produced in the past while taking into account the proximity of the measured values and of measurement noise, and in updating the tracks.

The tracking of multiple targets (multiple target tracking or MTT) by a sensor involves processing that consists in creating or updating tracks on the basis of newly acquired data. This is typically done (see in particular Samuel Blackman, Robert Popoli—"Design and Analysis of Modern Tracking Systems"—Artech House 1999) by chaining five functions: processing of new observations, association of the observations with tracks, management of the tracks (initialization, confirmation or deletion), filtering and prediction (to update the tracks and to enable estimation of positions in the near future), and windowing (in order to allow associations in the near future while restricting the possible associations to a volume about the predicted position).

However sometimes a number of tracks may conflict, for example when there is an intersection of the volumes about predicted positions. In nearest neighbor (NN) processing, each track is updated by the closest observation, even if the observation is compatible with a plurality of tracks. In global nearest neighbor (GNN) processing, the association is made while considering all the associations compatible with the windowing, but under the constraint that an observation can be associated only with at most one track.

The kinematic parameters of the tracks are typically updated by Kalman filtering (see Yaakov Bar-Shalom, Xiao-Rong Li—"Estimation and Tracking"—Artech House 1993) or by interacting multiple model (IMM) processing (see Yaakov Bar-Shalom, Xiao-Rong Li—"Multitarget-multisensor tracking: Principles and techniques"—1995 or Samuel Blackman, Robert Popoli—"Design and Analysis of Modern Tracking Systems"—Artech House 1999) if it is desired to use an array of Kalman filters in parallel to make it possible to adapt to a kinematic change. However, S. Blackman notes that GNN association processing associated with Kalman filtering only functions well when the targets are widely spaced (see in particular Samuel Blackman—"Multiple Hypothesis Tracking For Multiple Target Tracking"—IEEE A&E Systems Magazine, January 2004 vol. 19, no. 1, Part 2: tutorials, p5-18). In situations of conflict between tracks, the covariance matrix of the Kalman filter may be increased, but this may further increase the conflicts.

It is also known in the prior art to use a joint probabilistic data association (JPDA) approach, as for example described in 1995 by Yaakov Bar-Shalom et Xiao-Rong Li in "Multitarget-multisensor tracking: Principles and techniques". This method consists in updating the tracks with all the observations compatible with the windowing using a sum of the observations weighted by their probability. The drawback of this method is that it tends to make tracks that are closely spaced agglomerate.

Another way of managing cases of conflicts during associations is to use multiple hypothesis tracking (MHT) techniques such as for example introduced by D. B. Reid in "An algorithm for tracking multiple targets"—IEEE Transactions on Automatic Control, vol. 21, no. 1 (February 1976), p 101-104. This type of processing consists, in cases of association ambiguity, in memorizing and maintaining over time all the combinations of possible successions of associations between observations and tracks. In order to attempt to preserve only those tracks that persist over time, a score may be defined for the hypotheses, and only the best hypotheses finally adopted. These hypothesis scores may be defined by a likelihood ratio or by a log likelihood ratio of the likelihood that it be a track to the likelihood that it be a false alarm. This type of processing generates a combinatorial explosion that may be controlled by clustering, rejection or grouping of hypotheses, or by retaining only the k best hypotheses. It will be noted that these approaches use a priori probability hypotheses on the number of objects or false-alarm rates.

SUMMARY OF THE INVENTION

One aim of the invention is in particular to correct all or some of the drawbacks of the prior art by providing a solution allowing ambiguities related to crossovers in the tracking of mobile objects based on many measurements generated by one or more sensors to be correctly managed.

To this end, one subject of the invention is a method for managing track crossovers implemented by at least one device for tracking mobile objects comprising a group of at least one sensor, the tracking of mobile objects consisting in estimating a set of tracks corresponding to the various mobile objects perceived by the group of at least one sensor, each track corresponding to a set of successive plots representing the movement of a given mobile object, said method comprising, for each track at a given time, a step Stp1 of testing in order to determine whether the track in question is ambiguous or not at the given time and, if the track is ambiguous, a step Stp2 of specific processing of the estimate of the track.

According to one embodiment the method furthermore comprises a step Stp3 of notification of the state of ambiguity of the track under test at the given time.

According to one embodiment, a track k is said to be unambiguous at the time $t_l$ if it respects the relationship:

$$\sum_{\substack{j=1 \\ j \neq k}}^{K} \hat{q}_{l-1}^{j} g\left(\hat{C}_{l-1}^{k} + \hat{A}_{l-1}^{k}(t_l - t_{l-1}) - \hat{C}_{l-1}^{j} - \hat{A}_{l-1}^{j}(t_l - t_{l-1})\right) < \varepsilon \cdot \hat{r}_{l-1}^{k}$$

where: K is the total number of tracks created up to the time $t_{l-1}$, $\hat{q}_{l-1}^{j}$ is the estimate of the proportion of plots classed in track j up to the time $t_{l-1}$, g(.) is a probability density, $\hat{C}_{l-1}^{j} = \hat{A}_{l-1}^{j} t_{l-1} + \hat{B}_{l-1}^{j}$ is the estimate of the position vector of the track j at the time $t_{l-1}$, $\hat{A}_{l-1}^{j}$ is the estimate of the velocity of the track j at the time $t_{l-1}$ and $\hat{B}_{l-1}^{j}$ the estimate of the position vector of the track j at the time t=0, ε is a coefficient. In one embodiment this coefficient is 0.1, $\hat{r}_{l-1}^{k} = \hat{q}''_{l-1}^{k}/c$ where $\hat{q}''_{l-1}^{k}$ is the estimate of the proportion of the plots $X_n$ classed in a track far removed from the track k and c the integral of the domain of the admissible measurements.

According to one embodiment, a track k is said to be unambiguous at a time $t_l$ if for any track j≠k it respects the relationship:

$$\|\hat{C}_{l-1}^{k} + \hat{A}_{l-1}^{k}(t_l - t_{l-1}) - \hat{C}_{l-1}^{j} - \hat{A}_{l-1}^{j}(t_l - t_{l-1})\| > S$$

where: |||.||| represents the norm defined for a vector $X=(x_p)$ by $$\|X\| = \sup\left(\frac{|x_p|}{\sigma_p}\right)$$

where $\sigma_p$ is the standard deviation for the $p_{th}$ component of X in the density g(X), S is a predefined threshold.

According to one embodiment, the step of specific processing of the estimates of the tracks in the ambiguous state at a time $t_l$ is carried out by a recursive filter defined by:

$$\begin{cases} \hat{C}_l^k = \hat{C}_{l-1}^k + \hat{A}_{l-1}^k(t_l - t_{l-1}) + \hat{\alpha}_{l-1}^k M_1 g'\left(X_l - \hat{C}_{l-1}^k - \hat{A}_{l-1}^k(t_l - t_{l-1})\right) \\ \hat{A}_l^k = \hat{A}_{l-1}^k + \hat{\alpha}_{l-1}^k M_2 g'\left(X_l - \hat{C}_{l-1}^k - \hat{A}_{l-1}^k(t_l - t_1)\right) \end{cases}$$

where $X_l$ is the plot measured at the time $t_l$ $\hat{C}_l^k = \hat{A}_l^k t_l + \hat{B}_l^k$ is the estimate of the track in question at the time $t_l$, $\hat{\alpha}_{l-1}^k$ is a weighting parameter, $M_1$ and $M_2$ are matrix gains ensuring the stability of the filter, g'(X) is the gradient of the probability density g(.).

According to one embodiment, the parameter $\hat{\alpha}_{l-1}^k$ is defined by $$\hat{\alpha}_{l-1}^k = \frac{\hat{r}_{l-1}^k}{\hat{r}_{l-1}^k + \sum_{\substack{j=1 \\ j \neq k}}^{K} \hat{q}_{l-1}^j g\left(X_l - \hat{C}_{l-1}^j - \hat{A}_{l-1}^j(t_l - t_{l-1})\right)}$$

where $\hat{r}_{l-1}^k = \hat{q}''_{l-1}^k/c$.

$\hat{q}_{l-1}^j$ is the proportion of the plots $X_n$ classed in the track j at the time $t_{l-1}$, $\hat{C}_{l-1}^j$ is the estimate of the track in question, $\hat{A}_{l-1}^j$ is the estimate of the velocity of the track in question.

According to one embodiment, the parameter $\hat{\alpha}_{l-1}^k$ is equal to 0 when the track is ambiguous and is equal to 1 in the contrary case.

According to one embodiment, if duration for which a track is considered to be ambiguous is longer than a predefined threshold, said track is considered to be unambiguous.

According to one embodiment, the group of at least one sensor is chosen from passive sensors, radar sensors, sonar sensors, optronic sensors or any combination of these sensors.

Another subject of the invention is a device for tracking mobile objects, which device is suitable for implementing the method as described above, comprising a group of at least one sensor, a tracking module that is configured to track over time mobile objects on the basis of plots and to calculate and/or update tracks, a table of the tracks containing the list of the tracks tracked by the device, a module for managing crossovers that is configured to apply a set of processing operations in case of track ambiguity, and a publication module configured to transmit to the exterior data from the table of the tracks.

According to one embodiment, the group of at least one sensor is chosen from passive sensors, radar sensors, sonar sensors, optronic sensors or any combination of these sensors.

BRIEF DESCRIPTION OF THE DRAWINGS

Other particularities and advantages of the present invention will become more clearly apparent on reading the following description, which is given by way of nonlimiting illustration, and with reference to the appended drawings, in which.

DETAILED DESCRIPTION

Figure 1:
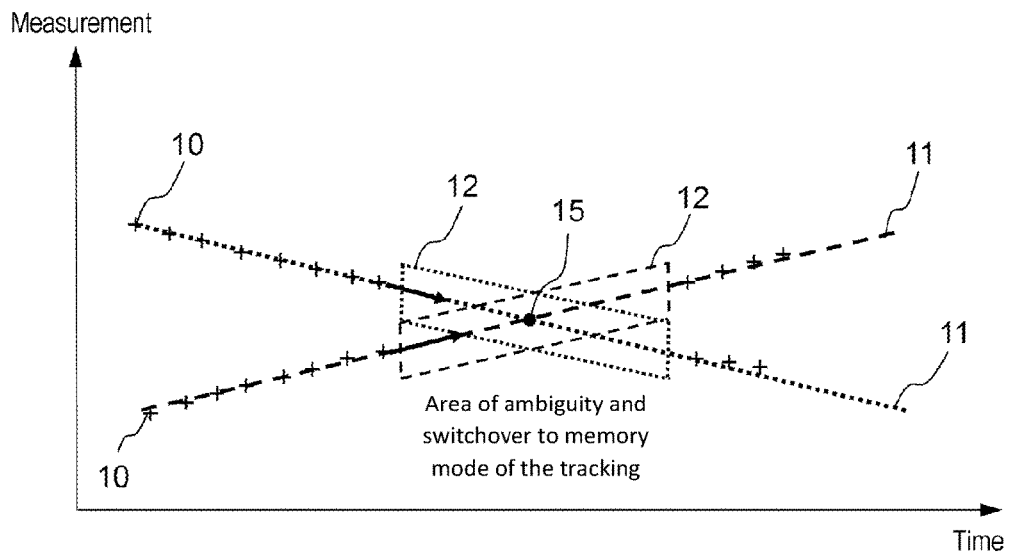
FIG. 1 illustrates an exemplary 2-track crossover geometry.

The processing according to the invention may be implemented by a device for tracking mobile objects comprising one or more sensors.

The processing for managing crossovers according to the invention is based on a model characterising a track and the track closest to it from all the tracks. For this processing, it will be assumed that only two tracks cross and that the other tracks do not interact with these two tracks.

Below, the processing for managing crossovers according to the invention will be described for a linear variation in the measurements as a function of time.

When the measurements output by the one or more sensors are not noisy, each track k describes a straight line of equation $A^k \cdot t + B^k$ where t designates the time, $A^k$ designates the vector of the rate of change of the measurements of track k, and where $B^k$ designates the position vector at the time t=0 of the measurements of track k.

In the presence of noise, for each n, the plot $X_n$ at the time $t_n$ is a measurement value or a measurement vector that corresponds to one of K tracks in the presence of an additive white noise of probability density g(.) that is assumed known. It is therefore possible to write, if the plots $X_n$ are considered to vary linearly as a function of time $t_n$:

$$X_n = A^{f(n)} t_n + B^{f(n)} + W_n; \quad n=1,2,\ldots,N \quad \text{(Equation 1)}$$

where $W_n$ corresponds to the white noise (which is independent of n) of probability density g(.) and f(.) is an unknown function of [1,2,...,N] in [1, 2, ..., K] indicating which track k corresponds to the plot $X_n$.

The objective is to find a processing operation that allows the coefficients $A^k$ and $B^k$, the index k representing the track, to be estimated by means of the plots $X_n$ without knowing either the function f(.) or k. Such as stated, this problem leads to a combinatorial explosion and cannot be processed in the form of equation 1 because of the many unknowns, in particular the function f(.). It is therefore chosen to simplify this model. To do this, recourse is made to a statistical model taking into account average effects instead of the physical reality expressed by equation 1.

Two tracks defined by A, B and by A', B' are considered to be close in the vicinity of the time $t_n$ if $$\|(A-A')t+B-B'\| < \text{threshold for } t \text{ belonging to the vicinity of } t_n$$

with $$\|X\|^2 = \sum_{p=1}^{P} \frac{x_p^2}{\sigma_p^2}$$

where $X=(x_1, x_2, \ldots, x_P)$, P is the number of components of X and $\sigma_p$ is the standard deviation of $x_p$.

For a track close to a crossover situation in the vicinity of the time $t_n$, the plot $X_n$ belongs either to the track of interest, or to a track that is close to the track of interest, or to tracks that are further removed. It is proposed to write equation 1, and the time $t_n$, in the form:

$$X_n = \varepsilon_n(At_n+B) + \varepsilon'_n(A't_n+B') + \varepsilon''_n U_n + W_n \quad \text{(Equation 2)}$$

where $\varepsilon_n$, $\varepsilon'_n$, $\varepsilon''_n$ are such that only one of these three coefficients is nonzero with a respective probability of these three states q, q', q'' respecting q+q'+q''=1, A et B correspond to the coefficients of the track of interest, A' et B' correspond to the coefficients of a track that is close to the track of interest, $W_n$ corresponds to the noise, which is white, independent of n and of probability density g(.), $U_n$ models the other further-removed tracks in the form of a sequence of independent random variables that are equally distributed over the value domain of the measurements in order to translate the unknown nature of these tracks and to formulate the fewest possible hypotheses on their value.

It will be noted that the model of equation 2 is more general than that of equation 1, because it also takes into account, by the presence of the term $U_n$, false measurements that correspond to no track.

The probability density of the plots $X_n$, i.e. the density modeled by equation 2, is given by the following equation:

$$p(X_n) = qg(X_n - At_n - B) + \left[\frac{q''}{c} + q'g(X_n - A't_n - B')\right] \quad \text{(Equation 3)}$$

where c is the integral of the domain of the admissible measurements (i.e. of the domain to which the measurements can belong).

$$\frac{1}{c}$$

is the probability density of $U_n$.

Because of the independence of the $X_n$, it is possible to write:

$$p(X_1, X_2, \ldots, X_N) = \prod_{n=1}^{N} (qg(X_n - At_n - B) + (1-q)h(X_n)) \quad \text{(Equation 4)}$$

with h(.) defined by:

$$h(X_n) = \frac{q''}{c} + q'g(X_n - A't_n - B') \quad \text{(Equation 5)}$$

In equation 4, the number of parameters of the model of equation 1 has been considerably decreased while nonetheless preserving its "nature". In reality, equation 1 has been incorporated into a family of models represented by one and the same measure of probability.

In order to estimate the value of the parameters A and B of the tracks, it is proposed to calculate the maximum likelihood estimator of (A, B) from the plots $X_n$, with n=1, 2, ..., N, while assuming q, q', A' and B' to be known. This consists in estimating the parameter θ of a random model characterized by a probability density $p(X_1, X_2, \ldots, X_n, \theta)$ by means of:

$$\hat{\theta} = \underset{\theta}{\mathrm{ArgMax}}\, p(X_1, X_2, \ldots, X_N, \theta)$$

where $X_1, X_2, \ldots, X_n$ are the plots output by the one or more sensors.

From equations 4 and 5:

$$\ln(p(X_1, X_2, \ldots, X_N, A, B)) = \sum_{n=1}^{N} \ln\left(1 + q\frac{g(X_n - At_n - B) - h(X_n)}{h(X_n)}\right) + \sum_{n=1}^{N} \ln(h(X_n))$$

and $$\underset{A,B}{\mathrm{ArgMax}}\ln(p(X_1, X_2, \ldots, X_N, A, B)) = \underset{A,B}{\mathrm{ArgMax}} \sum_{n=1}^{N} \ln\left(1 + q\frac{g(X_n - At_n - B) - h(X_n)}{h(X_n)}\right)$$

are obtained.

It is proposed to optimize the search for the maximum for the most difficult cases, i.e. when only very little of the track of interest can be seen. This is expressed by values of q close to 0.

After a limited development to the 1st order in q it is found that:

$$(\hat{A}, \hat{B}) = \mathrm{ArgMax} \sum_{n=1}^{N} \frac{g(X_n - At_n - B)}{h(X_n)} \quad \text{(Equation 6)}$$

Formula (6) must be understood in the following way: all the local maxima of the function to be maximized are sought so as to find the parameters $(A^k, B^k)$ of all the tracks. It will also be noted that the processing operation of equation 6 assumes the parameters A', B', q and q' contained in the expression of h(.) to be known.

Two cases are worth examining:

A first case corresponds to the situation where, whatever the tracks k and j of 1, 2, ..., K, and $t_n$:

$$\underset{t_n}{\mathrm{Min}}\|(A^k - A^j)t_n + (B^k - B^j)\|^2 > \text{threshold} \quad \text{(Equation 7)}$$

This case corresponds to the situation where no track crossover occurs over the duration of the processing. Then $h(X_n) \approx q''/c$, which is equal to a constant. The processing operation of equation 6 therefore simplifies to:

$$(\hat{A}, \hat{B}) = \underset{A,B}{\mathrm{ArgMax}} \sum_{n=1}^{N} g(X_n - At_n - B) \quad \text{(Equation 8)}$$

In this first case, no knowledge of the parameters of the other tracks or of q and q' is required by the processing—the tracks are completely decoupled.

A second case corresponds to the situation where the condition of equation 7 is not met. This corresponds to a situation of track crossover. As seen above, it is assumed, at the time at which the crossover occurs, that there are only two tracks that have crossed.

The measurements are divided into subsets or blocks of N measurements numbered l=0, 1, 2, . . . so that the plot of index n becomes a plot indexed l N+p where 0≤p<N.

From equations 5 and 6 it is found that for the block l:

$$(\hat{A}_l, \hat{B}_l) = \quad \text{(Equation 9)}$$

$$\underset{A,B}{\mathrm{Arg\,Max}} \sum_{m=0}^{l} \sum_{p=0}^{N-1} \frac{g(X_{mN+p} - At_{mN+p} - B)}{\frac{q''}{c} + q'g(X_{mN+p} - A't_{mN+p} - B')}$$

So as to define a processing operation that may be applied to all of the blocks, it is assumed that the estimates of rank l–1 necessary to calculate $\hat{A}_l$ and $\hat{B}_l$ are known. Therefore, $\hat{A}_{l-1}^k, \hat{B}_{l-1}^k, \hat{q}_{l-1}^k, \hat{q}''_{l-1}^k/c = \hat{r}_{l-1}^k$ is known for each track and it is proposed to estimate the $A^k$ and $B^k$ of rank l, in light of equation 9, by:

$$(\hat{A}_l^k, \hat{B}_l^k) = \underset{A,B}{\mathrm{Arg\,Max}} \quad \text{(Equation 10)}$$

$$\sum_{m=0}^{l} \sum_{p=0}^{N-1} \frac{g(X_{mN+p} - At_{mN+p} - B)}{\hat{r}_{l-1}^k + \sum_{\substack{j=1 \\ j \neq k}}^{K} \hat{q}_{l-1}^j g(X_{mN+p} - \hat{A}_{(m-1)N+p}^j t_{mN+p} - \hat{B}_{(m-1)N+p}^j)}$$

where $c\,\hat{r}_{l-1}^k$ is the proportion of the plots $X_n$ not classed in the track k for n=1,2, . . . , (l–1)N, (the proportion of tracks that were ambiguous with the track k prior to the time of calculation is neglected)

$\hat{q}_{l-1}^j$ is the proportion of plots $X_n$ classed in the track j for n=1,2, . . . , (l–1)N.

For the rank l, the value $\hat{q}_l^k$ is updated for the track k with the new proportion of plots assigned to the track k.

On account of the fact that it is being considered that only two tracks cross, it will also be noted that in the summation, in the denominator of equation 10, at most one term is nonzero.

The maximization of equation 10 may be obtained in various ways.

In a first way, the maximization is obtained by calculating the function to be maximized in a grid of values of A and B about the preceding estimate $(\hat{A}_{l-1}^k, \hat{B}_{l-1}^k)$.

According to a second method, the maximization is obtained by a gradient algorithm (Newton method) from $(\hat{A}_{l-1}^k, \hat{B}_{l-1}^k)$. This method is most often used when the length N of the blocks is equal to 1. In this case the index l and the index n are indistinguishable. $C_l^k = A^k t_l + B^k$ is defined, and after the gradient has been taken, the following is found:

$$\begin{cases} \hat{C}_l^k = \hat{C}_{l-1}^k + \hat{A}_{l-1}^k(t_l - t_{l-1}) + \\ \quad \hat{\alpha}_{l-1}^k M_1 g'\left(X_l - \hat{C}_{l-1}^k - \hat{A}_{l-1}^k(t_l - t_{l-1})\right) \\ \hat{A}_l^k = \hat{A}_{l-1}^k + \hat{\alpha}_{l-1}^k M_2 g'\left(X_l - \hat{C}_{l-1}^k - \hat{A}_{l-1}^k(t_l - t_{l-1})\right) \end{cases} \quad \text{(Equation 11)}$$

In this written form:
g'(X) is the gradient of g(.) with respect to X;
$M_1$ and $M_2$ are two gains (which are possibly matrices if the matrix of second derivatives is taken into account in the Newton method) that ensure the stability of the filter defined by equation 11 and adjust its bandwidth; and $\hat{\alpha}_{l-1}^k$ is a weighting parameter dependent on the state of ambiguity of the track in question, and which is defined by:

$$\hat{\alpha}_{l-1}^k = \frac{\hat{r}_{l-1}^k}{\hat{r}_{l-1}^k + \sum_{\substack{j=1 \\ j \neq k}}^{K} \hat{q}_{l-1}^j g\left(X_l - \hat{C}_{l-1}^j - \hat{A}_{l-1}^j(t_l - t_{l-1})\right)} \quad \text{(Equation 12)}$$

The influence of this weighting parameter $\hat{\alpha}_{l-1}^k$ may be understood as follows. When there are no track crossovers at the time $t_l$, $$\sum_{\substack{j=1 \\ j \neq k}}^{K} \hat{q}_{l-1}^j g\left(X_l - \hat{C}_{l-1}^j - \hat{A}_{l-1}^j(t_l - t_{l-1})\right) = 0,$$

and $\hat{\alpha}_{l-1}^k = 1$. The filter of equation 11 then behaves just like the conventional filters employed in multi-object tracking. A copy of the dynamic variation of the tracks is obtained and the delta (difference between the plot and the estimate of the plot) is passed through a gate. In this case, the filter of equation 11 corresponds to the gradient algorithm for processing equation 8, and the method proposed here allows the type of gate that must be employed to be specified.

In case of track crossover, the parameter $\hat{\alpha}_{l-1}^k$ becomes strictly lower than 1 and decreases until the time of crossover. This parameter then increases to 1. As the value of this parameter decreases, the filter takes the plot X less and less into account at the various times. This may be interpreted as a gradual switchover to "memory" mode, that, for its part, is characterized by $\hat{\alpha}_{l-1}^k = 0$. This "memorization" is then gradually abandoned as the tracks separate from each other.

FIG. 1 shows, via a graph, the geometry of one exemplary crossover of two tracks 11.

In this graph the successive positions 10 of plots forming two tracks 11 that cross at a point of intersection 15 are shown. Each plot corresponds to a measurement vector X delivered by one or more sensors. The successive plots of a track characterize the movement of the tracked mobile object.

On approaching the point of intersection 15, the tracks 11 enter into an area of ambiguity 12. This area 12 corresponds to the period for which the tracks are close, and in which it becomes difficult to know to which track the plots 10 belong.

Figure 2:
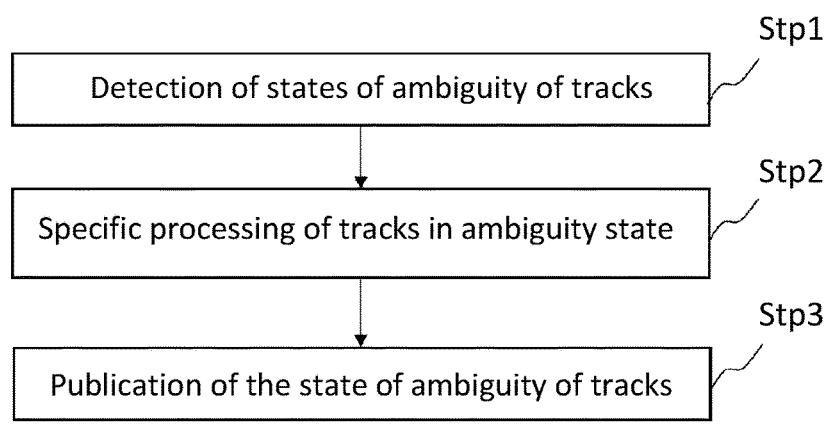
FIG. 2 shows possible steps of the method for managing crossovers according to the invention.

FIG. 2 shows possible steps of the method for managing crossovers in the tracking of mobile objects according to the invention. This method may comprise for each track at each time $t_n$, a step Stp1 of testing the state of ambiguity of the track in question in order to determine whether the track in question is ambiguous or not at the given time and, if the track is ambiguous, a step Stp2 of specific processing of the estimate of the track taking into account the ambiguity of the track under test at the given time $t_n$.

The method may also comprise a step Stp3 of notification of the state of ambiguity of the track under test at the given time $t_n$.

The step Stp1 of detecting states of track ambiguity consists, for each track at the time $t_l$, in verifying whether this track is in a state of ambiguity or not. To do this a track separation criterion is defined.

According to one embodiment, the track k is said to be unambiguous at the time $t_l$ if the following test is passed:

$$\sum_{\substack{j=1 \\ j \neq k}}^{K} \hat{q}_{l-1}^j g\left(\hat{C}_{l-1}^k + \hat{A}_{l-1}^k(t_l - t_{l-1}) - \hat{C}_{l-1}^j - \hat{A}_{l-1}^j(t_l - t_{l-1})\right) < \varepsilon \hat{r}_{l-1}^k \quad \text{(Equation 13)}$$

where K is the total number of tracks created up to the time l−1,
$\hat{C}_l^j = \hat{A}_l^j t_l + \hat{B}_l^j$ is the estimate of the position vector of the track j at the time $t_l$,
$\hat{A}_l^j$ the estimate of the velocity vector of the track j at the time $t_l$ and $\hat{B}_l^j$ the estimate of the position vector of the track j at the time t=0.
$\hat{q}_{l-1}^j$ is the estimate of the proportion of the plots $X_n$ classed in the track j for n=1,2, . . . , (l−1)N,
g(.) is the probability density of the measurement noise,
ε is a coefficient. In one embodiment this coefficient is 0.1,
$\hat{r}_{l-1}^k = \hat{q}''_{l-1}^k/c$ where $\hat{q}''_{l-1}^k$ is the estimate of the proportion of the plots $X_n$ classed in a track far removed from the track k and c the integral of the domain of the admissible measurements.

When the track k fails the test, the track k is said to be ambiguous at the time $t_l$.

In this step, an indicator may be updated for the track in question to indicate that, at the given time, the track is in an ambiguous or unambiguous state.

The ambiguity detection is carried out at each time $t_n$, the time interval between two times $t_n$ possibly being regular or not.

According to another embodiment, a track k is said to be unambiguous at the time $t_l$ if for any track j≠k:

$$|||\hat{C}_{l-1}^k + \hat{A}_{l-1}^k(t_l - t_{l-1}) - \hat{C}_{l-1}^j - \hat{A}_{l-1}^j(t_l - t_{l-1})||| > S$$

where |||.||| the norm defined for a vector $X=(x_p)$ by $$|||X||| = sup\left(\frac{|x_p|}{\sigma_p}\right)$$

where $\sigma_p$ is the standard deviation for the $p^{th}$ component of X in the density g(X),
S is a predefined threshold.

When a track is in a state of ambiguity, a processing operation specific to the management of crossovers is added to the tracking processing. This specific processing operation consists of a recursive processing operation or recursive filter applied using equation 11, which was presented above.

According to a first embodiment of the method according to the invention, the step Stp2 of specific processing of the data relating to the tracks in a state of ambiguity consists of switching to memory mode, i.e. new measurements are not taken into account when updating a track during the period in which this track is in an area of ambiguity. This amounts to saying that the parameters of the position-predicting calculation no longer vary during the state of ambiguity. In other words, this amounts to setting the parameter $\hat{\alpha}_{l-1}^{k}$ of equation 11 to zero when the track is ambiguous in order to no longer take into account the measurements. When the track is not ambiguous, the value of this parameter is set to 1.

According to another embodiment, gradual switchover to "memory" mode is performed in order to achieve a less abrupt transition with respect to the preceding method. This softer transition is achieved by calculating the parameter $\hat{\alpha}_{l-1}^{k}$ using equation 12, which was seen above. When the track enters the area of ambiguity, the value of the parameter $\hat{\alpha}_{l-1}^{k}$ begins to gradually decrease and the plots are taken into account less and less. Likewise, as the tracked object gets further from the point of intersection of the two tracks, the value of the parameter $\hat{\alpha}_{l-1}^{k}$ will gradually increase to a value substantially equal to 1.

Switching to "memory" mode makes it possible to ensure that the tracks are not deviated by errors due to mixup of the plots between the two tracks at the moment of the crossover.

Advantageously, the implementation of the first method is much less expensive in computational terms.

The state of ambiguity is temporary: it starts, lasts and ends depending on the variation in the measurements measured for the tracked mobile objects over time. According to one embodiment of the method, when the duration for which a track is considered to be ambiguous exceeds a predefined threshold, this track is considered to be unambiguous in order to prevent it from remaining in a state of ambiguity for too long.

The two processing variants described above assume a linear variation in the measurements as a function of time. This provides flexibility for the tracking of mobile objects. However, in certain cases it may be necessary to take into account an order higher than the second order in order to be able to better track the movements of these objects—for example, the acceleration of relative movements could be taken into account.

The processing operations may be generalized, for example, to the third order for plot variations that are locally not entirely linear, and for any order higher than or equal to 2.

Keeping the above notations, equation 1 becomes:

$$X_n = D^{f(n)} t_n^2 + A^{f(n)} t_n + B^{f(n)} + W_n; \; n=1,2,\ldots,N \quad \text{(Equation 14)}$$

where the parameter D makes it possible to introduce an acceleration term that is a function of time.

Equation 9 becomes:

$$(\hat{A}_l, \hat{B}_l, \hat{D}_l) = \underset{A,B,D}{\text{Arg Max}} \quad \text{(Equation 15)}$$

$$\sum_{m=0}^{l} \sum_{p=0}^{N-1} \frac{g(X_{mN+p} - Dt_{mN+p}^2 - At_{mN+p} - B)}{\frac{q''}{c} + q' g(X_{mN+p} - D' t_{mN+p}^2 - A' t_{mN+p} - B')}$$

Equation 10 becomes:

$$(\hat{A}_l^k, \hat{B}_l^k, \hat{D}_l^k) = \underset{A,B,D}{\text{Arg Max}} \quad \text{(Equation 16)}$$

$$\sum_{m=0}^{l} \sum_{p=0}^{N-1} \frac{g(X_{mN+p} - Dt_{mN+p}^2 - At_{mN+p} - B)}{\hat{r}_{l-1}^k + \sum_{\substack{j=1 \\ j \neq k}}^{K} \hat{q}_{l-1}^j g(X_{mN+p} - \hat{D}_{(m-1)N+p}^j t_{mN+p}^2 - \hat{A}_{(m-1)N+p}^j t_{mN+p} - \hat{B}_{(m-1)N+p}^j)}$$

The recursive processing of equation 11 may be similarly generalized, as may equations 12 and 13.

In a step Stp3, information on the state of track ambiguity is published with the track. According to one embodiment, each track for example comprises an indicator indicating the state of ambiguity and therefore whether the measurement corresponds to an extrapolation or to an actual measurement. This makes it possible to know at the output whether the track publication is the result of calculations carried out on measurements (case for a track outside of an area of ambiguity) or the result of the memory of the track (case for the track passing through an area of ambiguity). The downstream processing device to which the data are published thus knows, among the transmitted data, which are ambiguous and which are not.

The method for managing crossovers according to the invention may be applied to the tracking of mobile objects such as for example aircraft or ships. It may be implemented by one or more mobile object tracking devices comprising at least one sensor. The one or more sensors may be passive sensors, radar sensors, sonar sensors, optronic sensors or any combinations of these sensors.

Another subject of the invention is a device for tracking mobile objects, said device being able to implement the method for managing crossovers that was described above.

Figure 3:
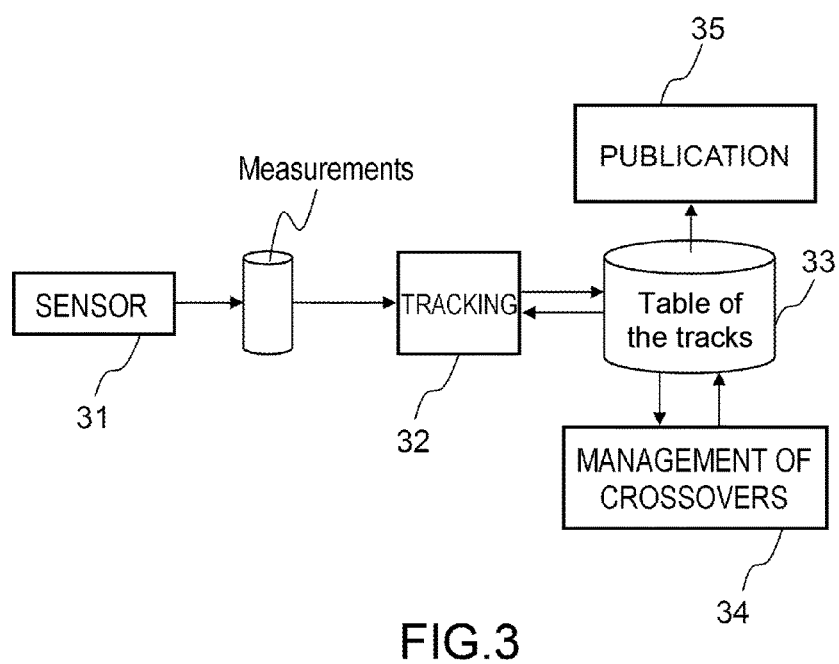
FIG. 3 shows an exemplary embodiment of a device for tracking mobile objects according to the invention.

FIG. 3 shows an exemplary embodiment of a device for tracking mobile objects according to the invention.

The device comprises at least one sensor 31 that delivers various measurements corresponding to objects moving in the monitored area. According to one embodiment, the one or more sensors 31 may be electronic support measure (ESM) sensors (capteurs de Mesure de Renseignement Electronique in French), radar sensors, optronic sensors or any combinations of these sensors in the case of a multisensor device.

A tracking module 32 takes each measurement vector $X_n$ in order to update the corresponding tracks in a table 33 of the tracks. This module tracks mobile objects over time using a table 33 of the tracks containing information on the tracked objects and using measurement vectors or plots $X_n$.

The table 33 of the tracks contains, for each tracked object, actual information and information summarizing the measurement vectors received recently. The table 33 of the tracks thus contains the same type of information as the measurements, i.e. one or more pieces of information on relative position indicating the location of the object in space relative to the sensor and optionally pieces of information describing the tracked objects. The content of the table 33 of the tracks thus varies over time depending on measurements delivered by the one or more sensors 31.

The device according to the invention also comprises a tracking module 32. The aim of this module is firstly to determine to which track, in the table 33, to attribute a measurement vector, and then to update the information of the track using the more recent data contained in the measurement vector. The tracking module 32 may thus create a new track if a measurement vector cannot be associated with an existing track in the table, or possibly delete a track if there have been no updates for this track for a long time.

A module 34 for managing crossovers takes action on the table of the tracks in case of track ambiguity by applying a set of additional processing operations as seen above. This module 34 complements the object tracking processing.

The tracking device comprises a publication module 35 configured to transmit to the exterior information on the tracking of the objects. The published data may correspond to any changes, such as for example one or more new tracks or recent track changes. These data are for example transmitted to another system, to one or more processing stages that are further downstream (such as a display), to another platform in the case where the device is embedded in a multi-platform system, etc.

The various modules described above may be one or more microprocessors, processors, computers or any other suitably programmed equivalent means.

The invention claimed is:

1. A method for managing track crossovers implemented by at least one device for tracking mobile objects, the method comprising:
   tracking of mobile objects by estimating a set of tracks corresponding to the mobile objects sensed by at least one sensor, each track corresponding to a set of successive plots representing a movement of a given mobile object,
   for each track at a given time, a step of testing with at least one processor in order to determine whether the track in question is ambiguous or not at the given time, a track k being said to be unambiguous at a time $t_l$ if the at least one processor determines that it respects the relationship:

$$\sum_{\substack{j=1\\j\neq k}}^{K} \hat{q}_{l-1}^{j} g\left(\hat{C}_{l-1}^{k} + \hat{A}_{l-1}^{k}(t_l - t_{l-1}) - \hat{C}_{l-1}^{j} - \hat{A}_{l-1}^{j}(t_l - t_{l-1})\right) < \varepsilon \cdot \hat{r}_{l-1}^{k}$$

or if for any track $j \neq k$ the at least one processor determines that it respects the relationship:

$$|||\hat{C}_{l-1}^{k} + \hat{A}_{l-1}^{k}(t_l - t_{l-1}) - \hat{C}_{l-1}^{j} - \hat{A}_{l-1}^{j}(t_l - t_{l-1})||| > S$$

in which relationships:
   K is a total number of tracks created up to a time $t_{l-1}$,
   $\hat{q}_{l-1}^{j}$ is an estimate of a proportion of plots classed in track j up to the time $t_{l-1}$,
   g(.) is a probability density,
   $\hat{C}_{l-1}^{j} = \hat{A}_{l-1}^{j} t_{l-1} + \hat{B}_{l-1}^{j}$ is an estimate of a position vector of the track j at the time $t_{l-1}$,
   $\hat{A}_{l-1}^{j}$ is an estimate of a velocity of the track j at the time $t_{l-1}$ and $\hat{B}_{l-1}^{j}$ is an estimate of a position vector of the track j at time t=0,
   $\varepsilon$ is a coefficient,
   $\hat{r}_{l-1}^{k} = \hat{q}_{l-1}^{"k}/c$ where $\hat{q}_{l-1}^{"k}$ is an estimate of a proportion of plots $X_n$ classed in a track far removed from the track k and c is an integral of a domain of admissible measurements $|||.|||$ represents a norm defined for a vector $X=(x_p)$ by:

$$|||X||| = sup\left(\frac{|x_p|}{\sigma_p}\right)$$

where $\sigma_p$ is a standard deviation for a $p^{th}$ component of X in a density g(X),
S is a predefined threshold, and
if the track is determined by the at least one processor to be ambiguous, the at least one processor implements a step of specific processing of the estimate of the track.

2. The method as claimed in claim 1 further comprises a step of notification of a state of ambiguity of the track under test at the given time.

3. The method as claimed in claim 1 wherein the step of specific processing of the estimates of the tracks in an ambiguous state at a time $t_l$ is carried out by a recursive filter defined by:

$$\begin{cases} \hat{C}_l^k = \hat{C}_{l-1}^k + \hat{A}_{l-1}^k(t_l - t_{l-1}) + \hat{\alpha}_{l-1}^k M_1 g'\left(X_l - \hat{C}_{l-1}^k - \hat{A}_{l-1}^k(t_l - t_{l-1})\right) \\ \hat{A}_l^k = \hat{A}_{l-1}^k + \hat{\alpha}_{l-1}^k M_2 g'\left(X_l - \hat{C}_{l-1}^k - \hat{A}_{l-1}^k(t_l - t_{l-1})\right) \end{cases}$$

where $X_l$ is a plot measured at the time $t_l$,
$\hat{C}_l^k = \hat{A}_l^k t_l + \hat{B}_l^k$ is an estimate of the track in question at the time $t_l$,
$\hat{\alpha}_{l-1}^k$ is a weighting parameter,
$M_1$ and $M_2$ are matrix gains ensuring a stability of the filter,
g'(X) is a gradient of a probability density g(.).

4. The method as claimed in claim 3 wherein the parameter $\hat{\alpha}_{l-1}^k$ is defined by $$\hat{\alpha}_{l-1}^k = \frac{\hat{r}_{l-1}^k}{\hat{r}_{l-1}^k + \sum_{\substack{j=1\\j\neq k}}^{K} \hat{q}_{l-1}^j g\left(X_l - \hat{C}_{l-1}^j - \hat{A}_{l-1}^j(t_l - t_{l-1})\right)}$$

where $\hat{r}_{l-1}^k = \hat{q}_{l-1}^{"k}/c$.
$\hat{q}_{l-1}^j$ is the proportion of the plots $X_n$ classed in the track j at the time $t_{l-1}$,
$\hat{C}_{l-1}^j$ is an estimate of the track in question,
$\hat{A}_{l-1}^j$ is the estimate of the velocity of the track in question.

5. The method as claimed in claim 3 wherein the parameter $\hat{\alpha}_{l-1}^k$ is equal to 0 when the track is ambiguous and is equal to 1 in a contrary case.

6. The method as claimed in claim 1 wherein if a duration for which a track is considered to be ambiguous is longer than a predefined threshold, said track is considered to be unambiguous.

7. The method as claimed in claim 1 wherein the at least one sensor comprises at least one of the following: passive sensors, radar sensors, sonar sensors, optronic sensors, or any combination of these sensors.

8. A device for tracking mobile objects, the device for tracking mobile objects configured to implement the method as claimed in claim 1 and comprising:

at least one sensor, a tracking processor module that is configured to track over time mobile objects on a basis of plots and to calculate and/or update tracks, a table of the tracks containing a list of the tracks tracked by the device for tracking mobile objects, a processor module for managing crossovers that is configured to apply a set of processing operations in case of track ambiguity, a track k being said to be unambiguous at a time $t_l$ if the processor module determines that it respects the relationship:

$$\sum_{\substack{j=1 \\ j \neq k}}^{K} \hat{q}_{l-1}^{j} g\left(\hat{C}_{l-1}^{k} + \hat{A}_{l-1}^{k}(t_l - t_{l-1}) - \hat{C}_{l-1}^{j} - \hat{A}_{l-1}^{j}(t_l - t_{l-1})\right) < \varepsilon \cdot \hat{r}_{l-1}^{k}$$

or if for any track j≠k the processor module determines that it respects the relationship:

$$\|\hat{C}_{l-1}^{k} + \hat{A}_{l-1}^{k}(t_l - t_{l-1}) - \hat{C}_{l-1}^{j} - \hat{A}_{l-1}^{j}(t_l - t_{l-1})\| > S$$

in which relationships:

K is a total number of tracks created up to a time $t_{l-1}$, $\hat{q}_{l-1}^{j}$ is an estimate of a proportion of plots classed in track j up to the time $t_{l-1}$, g(.) is a probability density, $\hat{C}_{l-1}^{j} = \hat{A}_{l-1}^{j} t_{l-1} + \hat{B}_{l-1}^{j}$ is an estimate of a position vector of the track j at the time $t_{l-1}$, $\hat{A}_{l-1}^{j}$ is an estimate of a velocity of the track j at the time $t_{l-1}$ and $\hat{B}_{l-1}^{j}$ is an estimate of a position vector of the track j at time t=0, ε is a coefficient, $\hat{r}_{l-1}^{k} = \hat{q}_{l-1}^{"k}/c$ where $\hat{q}_{l-1}^{"k}$ is an estimate of a proportion of plots $X_n$ classed in a track far removed from the track k and c is an integral of a domain of admissible measurements,

|||.||| represents a norm defined for a vector $X=(x_p)$ by:

$$\||X\|| = sup\left(\frac{|x_p|}{\sigma_p}\right)$$

where $\sigma_p$ is a standard deviation for a $p^{th}$ component of X in a density g(X), S is a predefined threshold, and a publication processor module configured to externally transmit data from the table of the tracks.

9. The device as claimed in claim 8 wherein the at least one sensor comprises one of the following: passive sensors, radar sensors, sonar sensors, optronic sensors, or any combination of these sensors.

10. The device as claimed in claim 8 wherein the publication processor module is configured to transmit data from the table of the tracks to another system.

11. The device as claimed in claim 8 wherein the publication processor module is configured to transmit data from the table of the tracks to another platform.

12. The device as claimed in claim 8 further comprising a display configured to display data from the table of the tracks.

13. The device as claimed in claim 8 wherein the coefficient ε is 0.1.

14. The method as claimed in claim 1 further comprising transmitting with a publication processor module information on the tracking of the objects.

15. The method as claimed in claim 1 further comprising transmitting with a publication processor module information on the tracking of the objects to another system.

16. The method as claimed in claim 1 further comprising transmitting with a publication processor module information on the tracking of the objects to another platform.

17. The method as claimed in claim 1 further comprising displaying on a display information on the tracking of the objects.

18. The method as claimed in claim 1 wherein the coefficient ε is 0.1.

* * * * *